(12) United States Patent
Hjalmarsson et al.

(10) Patent No.: US 8,447,425 B2
(45) Date of Patent: May 21, 2013

(54) DEVICE AND METHOD FOR CONTROLLING A WEB

(75) Inventors: Lennart Hjalmarsson, Bollebygd (SE); Sophia Törnqvist, Särö (SE); Anders Belin, Mölndal (SE)

(73) Assignee: SCA Hygiene Products AB, Göteborg (SE)

( * ) Notice: Subject to any disclaimer, the term of this patent is extended or adjusted under 35 U.S.C. 154(b) by 486 days.

(21) Appl. No.: 12/675,404

(22) PCT Filed: Aug. 28, 2008

(86) PCT No.: PCT/SE2008/000480
§ 371 (c)(1),
(2), (4) Date: Feb. 26, 2010

(87) PCT Pub. No.: WO2009/029017
PCT Pub. Date: Mar. 5, 2009

(65) Prior Publication Data
US 2010/0212136 A1   Aug. 26, 2010

(30) Foreign Application Priority Data
Aug. 29, 2007   (GB) .................................. 0716782.8

(51) Int. Cl.
*G06F 19/00*   (2006.01)

(52) U.S. Cl.
USPC ............................ 700/124; 700/122; 700/167

(58) Field of Classification Search
USPC .................................. 700/122, 124, 125, 167
See application file for complete search history.

(56) References Cited

U.S. PATENT DOCUMENTS

| | | | |
|---|---|---|---|
| 5,689,340 A * | 11/1997 | Young | ........................... 356/401 |
| 5,942,077 A | 8/1999 | Tang | |
| 6,732,778 B1 | 5/2004 | Machida et al. | |
| 2003/0051802 A1 | 3/2003 | Hargett et al. | |
| 2003/0171725 A1 * | 9/2003 | Gimenez et al. | ............... 604/358 |
| 2004/0028268 A1 | 2/2004 | Popp et al. | |
| 2005/0056678 A1 | 3/2005 | Nomura et al. | |
| 2006/0196594 A1 | 9/2006 | Shimizu et al. | |

FOREIGN PATENT DOCUMENTS

| JP | 09-005020 A | 1/1997 |
|---|---|---|
| JP | 2006-282372 A | 10/2006 |

OTHER PUBLICATIONS

International Search Report of Application No. PCT/SE2008/000480 dated Dec. 23, 2008. International Preliminary Report on Patentability of Application No. PCT/SE2008/000480 dated Nov. 17, 2009.

* cited by examiner

*Primary Examiner* — Charles Kasenge
*Assistant Examiner* — Chad Rapp
(74) *Attorney, Agent, or Firm* — Buchanan Ingersoll & Rooney PC

(57) ABSTRACT

An adaptive assembly line for assembly of a continuous first web to a continuous or discontinuous second web. The assembly line includes a control device. The control devices includes a first camera arranged to take a first picture of the first web before assembly of the first web to the second web. The control device is arranged to use the first picture for determining the position of a first center line in the first web. The control device is arranged to use the first picture for controlling the position of the first web and/or the second web so that the first center line becomes aligned with a second center line comprised in the second web during assembly of the first web to the second web.

20 Claims, 9 Drawing Sheets

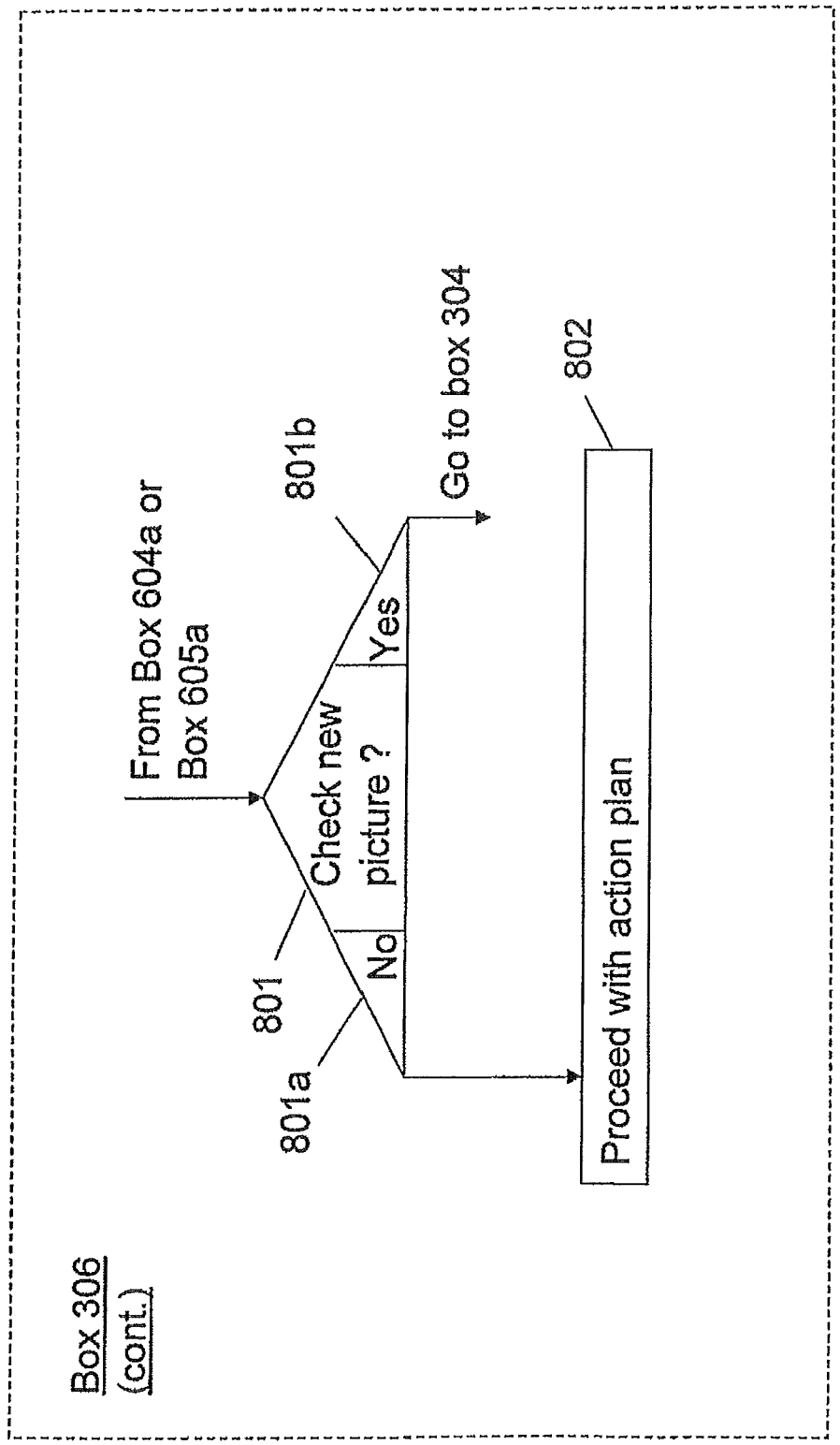

DEVICE AND METHOD FOR CONTROLLING A WEB

TECHNICAL FIELD

The invention relates to an adaptive assembly line for assembly of a continuous first web to a continuous or discontinuous second web. The assembly line is arranged to feed the first and the second web in a machine direction. The assembly line comprises a control device comprising a camera that takes a first picture of the first web. The control device comprises a first transformer for transforming the first picture into a first signal. The control device is arranged to control the position of a first web with relation to a second web. The invention also relates to a method for an adaptive assembly line.

BACKGROUND ART

When manufacturing absorbent articles such as diapers, sanitary napkins, incontinence protection article, etc., it is known to use a continuous conveyer belt onto which at least a part of the absorbent article is assembled. The sanitary napkin may comprise a topsheet, a backsheet and an absorbent body positioned therebetween. In the assembly line the absorbent body is positioned onto the conveyer belt and the topsheet is positioned onto the absorbent body. In the assembly line, the topsheet or the backsheet is in the form of a continuous web that is cut after being positioned onto the absorbent body.

When the first web comprises a pattern the pattern has a first centre line that shall be positioned in line with a second centre line comprised in the absorbent body. It is important that the first centre line is an optic centre line, i.e. the first centre line shall be a centre line according to the eye of an observer. When the first web comprises an elastic material the shape and form of the first web may vary due to material variations and/or strains in the material caused, for example, by machine parts in the manufacturing plant.

The machine parts may be rollers and stretchers, etc. arranged to bring the first web in a machine direction. When the first web changes form and shape the first centre line changes position, and as a consequence the position of the first centre line in relation to the second centre line is changed.

It is common to use the first web as a topsheet and that the topsheet comprises two side portions of a first material and a centre portion of a second material therebetween. The centre portion is attached to the side portions by, for example, welding, gluing, mechanical bonding etc. and the attachment process forms seams that become part of or form the pattern of the first web. In the assembly line the seams run in the machine direction, i.e. in the feeding direction of the first and second webs. The position of the seams may vary somewhat with respect to the lateral side edges of the first web due to different factors such as material variations and external forces acting on the first web. The shifting of the position of the seams affects the position of the first centre line, i.e. the optic centre line. Each lateral side edge of the first web also has an extension in the machine direction and since the seams vary with respect to the lateral side edges, it is not a sufficiently good solution to calculate the first centre line from the position of one or both of the side edges since this obvious gives a wrong position of the first centre line in the first web.

US 2004/0028268 teaches a lamination process where a first web is laminated to a second web forming a composite web. The process comprises the use of a camera that periodically takes pictures of the composite web. The pictures are converted into electrical signals and are compared to a number of selected parameters in order to determine if the first web is properly aligned with the second web. A problem with the process according to US 2004/0028268 is that the system detects a fault only after the composite web has been formed. The system allows for adjustment so that the fault is corrected, but the faulty part has to be rejected or accepted.

There is thus a need to control the first web in the lateral direction, i.e. in a direction being essentially perpendicular to the machine direction, so that the first centre line becomes aligned with the second centre line before assembly. The second centre line may be the centre line of a continuous web but may be the centre line of a broken web comprising a number of pieces of material arranged onto a conveyer belt.

Therefore, there is a need for an adaptive assembly line for detecting the first centre line and controlling the alignment of the first centre line of the first web to the second centre line of the second web, before the first web is positioned onto the second web.

DISCLOSURE OF INVENTION

The invention intends to remedy the above deficiencies and to find an adaptive assembly line for assembly of a continuous first web to a continuous or discontinuous second web. The assembly line is arranged to feed the first and the second web in a machine direction. The assembly line comprises a control device comprising a camera that takes a first picture of the first web. The control device comprises a first transformer for transforming the first picture into a first signal and the control device is arranged to control the position of the first web with relation to the second web.

The invention is characterized in that the camera is arranged to take the pictures before assembly of the first web to the second web and that the control device is arranged to use the first signal for determining the position of the first centre line in the first web and that the control device is arranged to use the first signal for controlling the position of the first web and/or the second web so that the first centre line becomes aligned with the second centre line during assembly of the first web to the second web.

One advantage of the invention is that a potential misalignment of the first centre line to the second centre line can be avoided before the assembly of the first web to the second web. In prior art detection system the camera is used to detect a faulty laminate, i.e. after assembly, which has to be rejected upon detection.

The control device is arranged to detect a pattern in the first web before assembly by use of the camera and a transformer that transforms a picture from the camera into electronic signals. The first camera is arranged to take pictures continuously or periodically.

The control device uses a pattern detection system for detection of the pattern in one or many pictures. The pattern detection system is arranged to store signatures of the pattern in the first web for detection of the pattern in the picture and/or defect signatures of the pattern for detection of a faulty pattern in the first web. The pattern detection system may be arranged to identify one significant part of the pattern or a sequence of parts being a significant part of the pattern.

The control device is arranged to calculate the position of the first centre line in the first web with regard to the pattern comprised in the first web. This is done after the detection of the pattern. The position of the first centre line can be calculated from the knowledge of the position of the pattern in the first picture since the camera advantageously is arranged in a fixed position relative the first web. The fixed position of the camera gives the possibility to define, for example, a grid pattern that can be used for defining the position of the first centre line and the second centre line. For example, a reference line can be arranged in the grid pattern, which reference line can be used for positioning the second web so that the second centre line is aligned with the reference pattern. The second centre line thus becomes known to the control device via the reference line before assembly so that the control device can calculate the misalignment between the first centre line and the second centre line before assembly.

The first and the second centre lines extend essentially in the machine direction and the assembly line comprises a first guidance device arranged to shift the position of the first web in a cross-machine direction, i.e. in a lateral direction, for alignment of the first centre line with the second centre line before the assembly point.

The first centre line is an optical centre line. The optical centre line can be defined as being a symmetrical line in a pattern where the symmetry lies in the eyes of a beholder. Hence, the first centre line shall be considered as a centre line in a pattern when a person is watching the pattern. The control device therefore comprises means for calculating the first centre line when the position of the pattern in the first web is known. The means for calculating may be an algorithm that can be programmed for the purpose.

The invention is especially advantageous when the first web comprises, in a cross-machine direction, two side portions and a centre portion bonded together by two seams running in the machine direction. The pattern in the first web is here defined by the one of or both the two seams. The side portions are often made from a different material than the centre portion and for a number of reasons the seams may vary somewhat in position in the first web after bonding of the side portions and the central portion. The reasons may be a difference in the different material in different positions along the first web and may be a result of the process where machines transport the first web in the machine direction and therefore affects the first web with external forces. The present invention is adaptive to such variations and the control device continuously monitors any variations of lateral variations of the first centre line and controls the first guidance device accordingly.

In one embodiment of the invention, the assembly line may comprise a conveyer belt for bringing the second web to the assembly point. The second web is positioned on the conveyer belt at a predetermined position. The use of a predetermined position assures that the control device has information regarding the position of the second centre line. The conveyer belt may for example comprise a reference line that is used when the second web is positioned on the conveyer belt. The second centre line is then aligned with the reference line. This embodiment is especially advantageous when the second web is a discontinuous web forming absorbent bodies that are to be laminated with the first web. The first web may then be a topsheet or a backsheet.

In a further embodiment of the invention, a second camera is arranged to take second pictures of the second web. The assembly line comprises a second transformer for transforming the second pictures into a second signal. A control device is arranged to use the second signal for determining the position of the second centre line in the second web and the control device is arranged to use the second signal for controlling the position of the second web so that the second web is position at it predetermined position on the conveyer belt. The control device may be a separate control device with respect to the control device that controls the first web or may be a part of the same or may the same.

However, the control device may be arranged to use the second signal for determining the position of the second centre line in the second web and the control device arranged to use the second signal for controlling the position of the first web and/or the second web so that the first centre line becomes aligned with the second centre line during assembly of the first web to the second web. This embodiment can be suitable when both the first web and the second web are continuous webs.

BRIEF DESCRIPTION OF DRAWINGS

The invention will below be described in connection to a number of drawings where:

FIGS. 4-9 schematically show a flow chart of a process according to the invention.

EMBODIMENT(S) OF THE INVENTION

Figure 1:
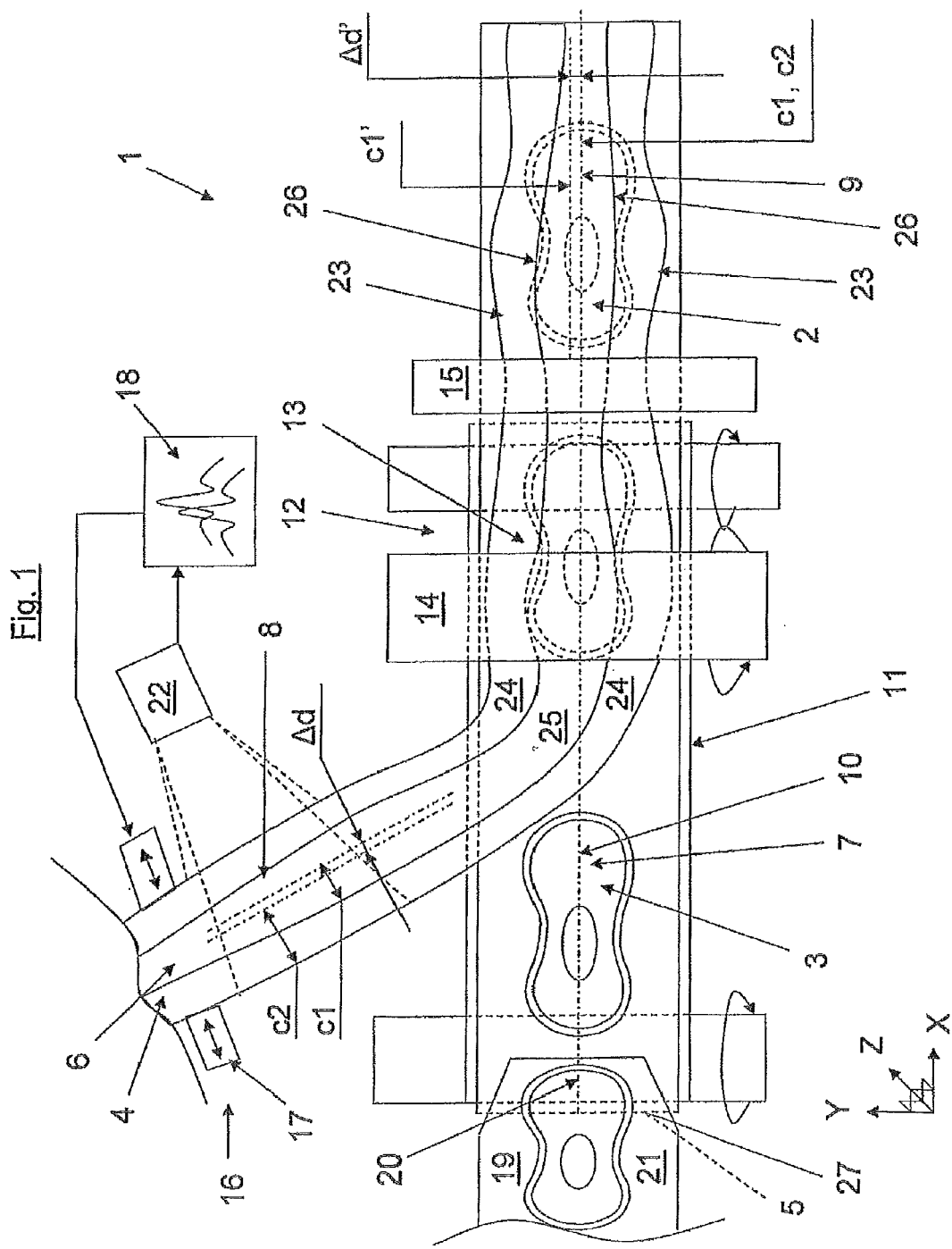
FIG. 1 schematically shows a top view of an adaptive assembly line according to the invention.

FIG. 1 schematically shows a top view of an adaptive assembly line 1 according to the invention. The adaptive assembly line 1 is arranged to assemble an absorbent article 2 comprising at least an absorbent body 3 and a topsheet 4 and/or a backsheet 5. The assembly line 1 is thus arranged to fit a continuous first web 6 to a continuous or discontinuous second web 7. In FIG. 1 the continuous first web 6 is the topsheet and the second web 7 is a discontinuous web in the form of a number of absorbent bodies. The first web 6 comprises a pattern 8 with an optical first centre line 9 and the second web 7 comprises a second centre line 10. The first centre line 9 and the second centre line 10 extend in the machine direction. Here "machine direction" refers to the feeding direction of a conveyer belt 11 comprised in the assembly line 1. The purpose of the assembly line 1 is to bring the first centre line 9 into alignment with the second centre line 10. In order to explain the invention further, the wording "lateral direction" will be used when describing a cross-machine direction. In the figures, the machine direction is denoted with X and the lateral direction with Y.

In FIG. 1 the first web 6 has been shown as being positioned on the side, Y-direction, of the second web 7 in order to more clearly describe the invention.

Figure 2:
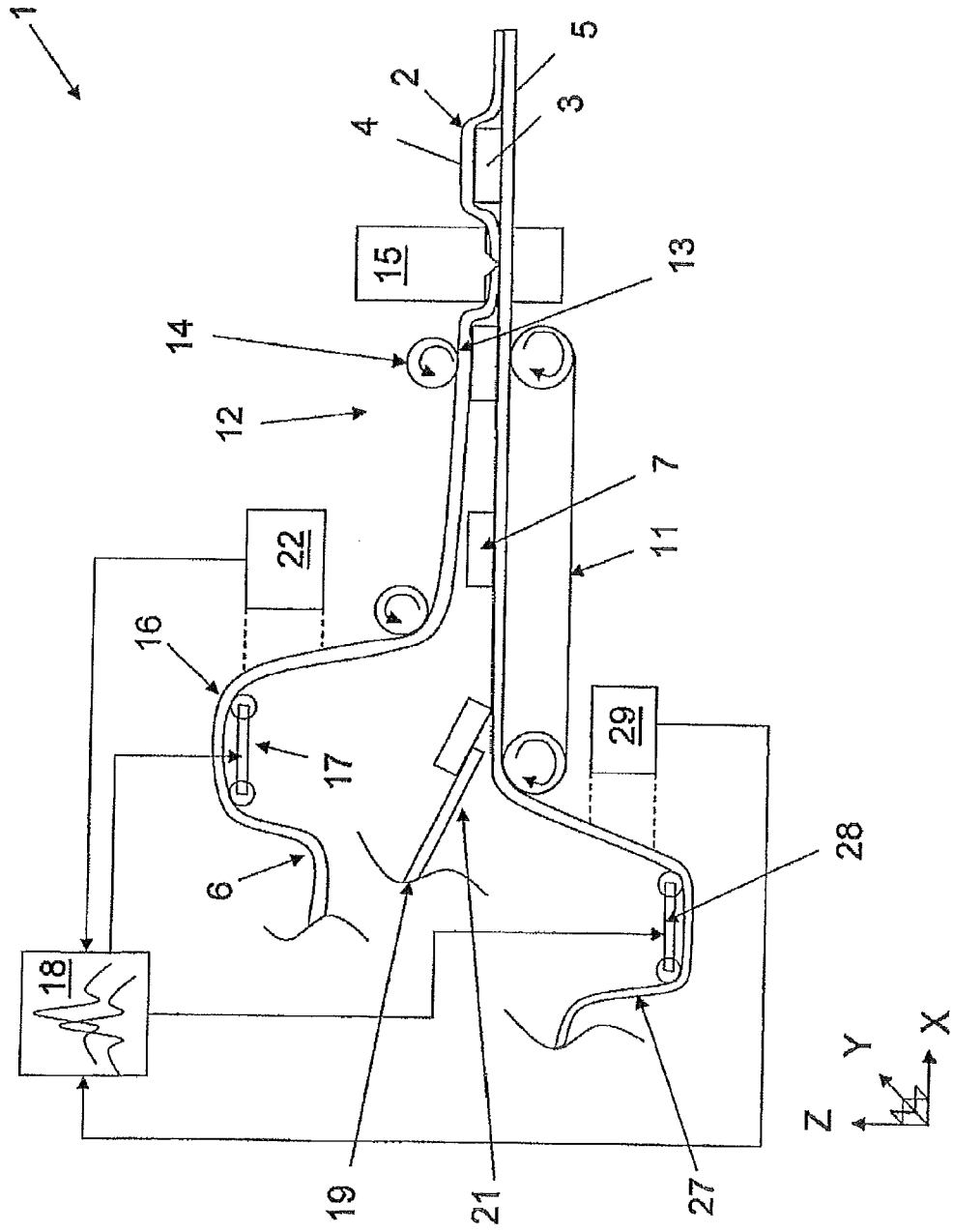
FIG. 2 schematically shows a side view of the assembly line according to FIG. 1 according to a first embodiment of the invention.
Figure 3:
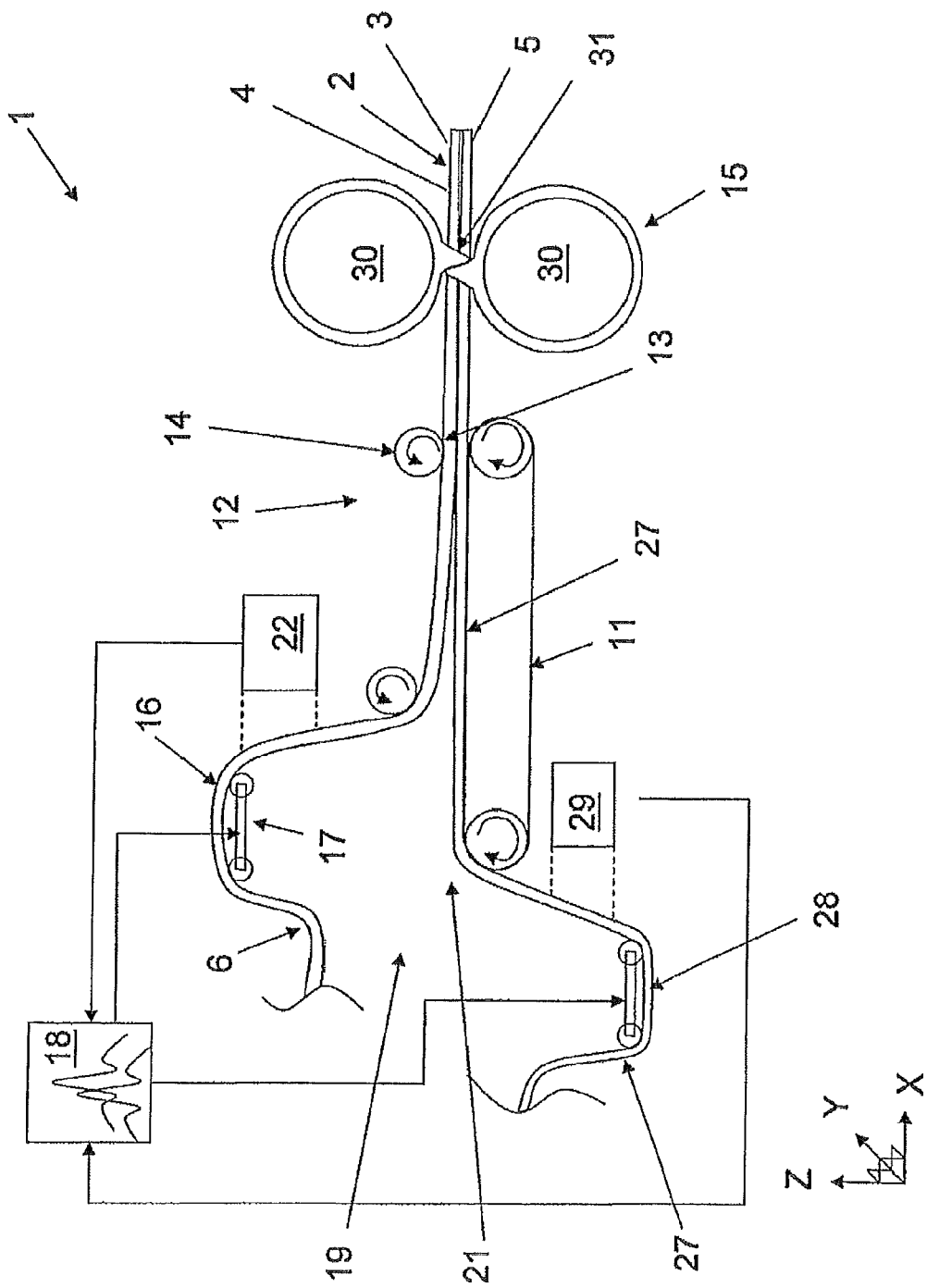
FIG. 3 schematically shows a side view of the assembly line according to FIG. 1 and according to a second embodiment of the invention, and where.

As a consequence, the first web is shown in the figure in such a manner that it looks crooked, but this is only to be regarded as an optical illusion since the first web 6 advantageously is positioned above the second web as shown in FIGS. 2 and 3.

The assembly line 1 comprises an assembly station 12 comprising an assembly point 13, also known as marriage point, where the first web 6 is attached to the second web 7 when the first centre line 9 is aligned with the second centre line 10. The assembly point 13 comprises a bonding device 14 for bonding the first web 6 to the second web 7. The assembly line also comprises a separating device 15 for separating the first web 6 into pieces. In FIG. 1 the assembly line 1 comprises a conveyer belt 11 onto which the first web 6 and the second web are positioned for assembly. If the second web 7 would have been a continuous web the conveyer belt 11 could have been opted out and a different type of assembly point 13 could have been chosen. For example, the assembly point 13 could be a roller or any moving surface that allows transportation of the first 6 and the second web 7 while the first web 6 is attached to the second web 7 with the bonding device.

In FIG. 1 the assembly line 1 comprises a first transport system 16 for feeding the first web 6 to the conveyer belt 11 and a second transport system for feeding the second web 7 to the conveyer belt 11.

The first transport system 16 is a system for continuously feeding the first web 6 to the conveyer belt in the machine direction. The first transport system 16 comprises a number of rollers over which the first web 6 is fed with a selected speed and tension. The first transport system comprises a first guidance device 17 for controlling the lateral position of the first web over the rollers. The assembly line 1 comprises a control device 18 for controlling the first guidance device 17 that controls the lateral position of the first web before the assembly point.

In FIG. 1, a second transport system 19 is arranged for positioning of the second web 7 at a pre-selected position on the conveyer belt 11. The second transport system 19 may be connected to the control device 18 or may be connected to a separate control device (not shown). However, the control device 18 of the first web 6 needs to comprise information on the position of the second centre line 10 in order to align the first centre line 9 with the second centre line 10. The pre-selected position may refer to a reference line 20 in the conveyor belt running in the machine direction of the assembly line 1. When the second centre line 10 is positioned in alignment with the reference line 20 the second web 7 has been placed in the pre-selected position. The reference line 20 is advantageously known to the control device 18 and the control device 18 thus assumes that the second web 7 is positioned in the pre-selected position and that the second centre line 10 is in alignment with the reference line 20. Hence, the position of the second centre line 10 is known to the control device 18. In FIG. 1 the second web 7 is a discontinuous web and the second transport system 19 is therefore arranged to feed a number of absorbent bodies 3 to the conveyer belt. However, if the second web 7 is a continuous web the second transport system 19 can be of the same type as the first transport system 16. The assembly line 1 may comprise a second guidance device 21 that controls the position of the second web 7 in the assembly point 13. The second guidance device 21 may be controlled by the control device 18 or a different control device (not show). The second guidance device 21 is arranged to control the lateral Y position of the second web. Information regarding the position of the second centre line 10 may be fed continuously to the control device 18 for control of the relative position of the first web 6 to the second web 7 by use of the first 17 and second guidance devices 21 respectively.

In FIG. 1 the control device 18 comprises a first camera 22 that periodically or continuously takes a number of first pictures of the first web 6. The control device 18 also comprises a first transformer for transforming the first pictures into a corresponding number of first signals. The control device 18 is arranged to control the position of the first centre line 9 in the first web 6 with relation to the second centre line 10 of the second web 7. It is an object of the invention to continuously bring the first centre line 9 in alignment with the second centre line 10. The first camera 22 is therefore arranged to take the first pictures before assembly of the first web 6 to the second web 7. The closer the first camera 22 is positioned to the first guidance device 17 the quicker the response when a change in the first centre line 9 is detected. Here, "response" refers to the control of the lateral position of the first web 6 by use of the first guidance device.

The control device 18 is arranged to use the first signal for determining the lateral position of the first centre line 9 in the first web 6. The first centre line 9 may vary somewhat due to a number of different factors. For example, one factor is different thickness of the first web 6 which gives different elastic properties which gives a movement in the first web 6 that changes the position of the first centre line 9; another factor is that the first transport system has flaws, i.e. is not perfect, and therefore applies different forces on different parts of the first web 6 which causes movement within the first web 6 which changes the position of the first centre line 9.

The position of the first centre line 9 is determined by the aid of a picture recognizing system that transforms the first picture into a first signal, preferably an electrical signal. The first signal comprises information regarding any pattern 8 comprised in the first picture. For example, a certain pattern 8 in the first web 6 may be developed in the picture as being darker or brighter than its surroundings, i.e. there exists a number of different contrasts in a black and white photo. The difference in contrast (or colour if the picture is a colour picture) in the picture gives a signature in the first signal that differs from a signature caused by a non-patterned surface. The picture recognizing system scans the picture in a selected way and logs position and corresponding signatures and can therefore be used for identifying the pattern 8 and for calculating the first centre line 9 of the first web 6. The first centre line 9 may be calculated from a mean value in the first signal or a position between certain values, but may be calculated by use of any suitable method. The first centre line 9 is an optical centre line. Here "optic centre line" means that the eye of a human observer recognizes the first centre line to be the centre line of the pattern 8 in the first web. Hence, the first centre line 9 need not be a mathematically correct average or mean value of the pattern 8 but may be the centre line from an artistic point of view. The first centre line 9 may therefore be a symmetric centre line with regard to the pattern 8. The control device 18 may comprise one or many stored prepared signatures, i.e. id-signals, that identify the pattern in the first picture i.e. in the first web 6. The most recent first picture is then compared to the stored pictures, i.e. id-signals, in order to find a match and to thereby give the control device information on if a pattern 8 has been found or not. If a pattern 8 has been found the position of the first centre line 9 in the first web 6 is calculated in the control device 18 by use of the detected position of the pattern. It should be noted that it is not possible to calculate the first centre line 9 from detection of the lateral side edges 23 of the first web 6 since the pattern 8 in the first web 6 may vary in the lateral direction within the first web 6, which gives a first centre line 9 that varies dependent on the pattern 8 and not on the lateral side edges 23. Here "lateral side edges" refer to the side edges 23 of the first web 6 that have an extension in the machine direction X.

The control device 18 is arranged to use the first signal for controlling the position of the first web 6 and/or the second web 7 so that the first centre line 9 becomes aligned with the second centre line 10 during assembly of the first web 6 to the second web 7. This means that after the position of the first centre line 9 in the first web has been calculated the control device 18 uses the information together with information regarding the position of the second centre line 10, i.e., e.g. the reference line 20, in order to calculate any misalignment Δd between the first centre line 9 and the second centre line 10. The misalignment Δd is interpreted by the control device 18 so that the control device 18 can control the first web 6 and/or the second web 7 in the lateral direction, i.e. in a cross-machine direction Y being essentially perpendicular to the machine direction X.

The problem with a travelling first centre line 9, i.e. movement in the cross-machine direction, is especially common when the first web 6 comprises, in the cross-machine direction Y, two side portions 24 and a centre portion 25 bonded together by two seams 26 in the machine direction X. Here, the pattern 8 comprises the two seams 26 and the first centre line 9 shall be calculated with regard to the seams 26. The centre portion 25 is often made from a different material than the side portions 24 which can give different stretch of the different materials in different portions of the first web 6 which gives that the position of the seams 26 varies within the first web 6. Furthermore, even though the two seams 26 are often made in a device that performs bonding of the two seams 26 simultaneously and at the same distance, the lateral position of the first centre line 9 may vary since the side portions 24 and the centre portion 25 may have different properties and may thus affect the position of the seams differently. However, the first camera 22 and control device 18 may be arranged for detection of one or both the seams 26 for calculating the first centre line 9. In both cases, the first centre line 9 may be positioned at half the distance from one of the seams 26, i.e. in the middle of the seams 26. The best result is thus achieved when both seams 26 are detected since a more exact position of the first centre line 9 can be calculated. However, detection of one seam 26 together with an estimate of the lateral position of the first centre line is an improvement over the previously known control device where the position of the lateral side edge 23 are detected and used for control. Detection of one seam 26 together with an estimate of the lateral position of the first centre line 9 can advantageously be used, for example, when the other seam has been executed but the pattern of the second seam for some reason has been less visible. This can happen, for example, when an ultrasonic welding device is used for welding and where the seams comprise a number of embossed indentations that constitute the bonding areas of the seam 26. The embossed pattern may be less visible on one seam 26 than the other, but both the seams 26 may be adequately formed as such. The process should therefore be allowed, at least for a short while, because the pattern 8 may be weak only for a short period of time.

In FIG. 1, the control device 18 is arranged to store previous pictures of the pattern 8 in the first web. The pictures are converted into identity signals (hereinafter called id-signals or signatures) that are used for identification of the pattern 8 in the first picture. The stored id-signals can be both identifications of correct patterns and identification of a defect or wrong pattern. The stored correct id-signal may be in the form of an allowable range representing different variants of the correct pattern. The range can be in the form of a number of id-signals representing a number of pictures and patterns, but can also be a numerical range. The advantage of using a range is that the control device can recognize a correct pattern even if the pattern differs somewhat over time, but within the allowable range.

Here "defect" refers to a selected pattern that is not allowed. The control device 18 uses the stored defect pictures to recognise an already known and processed defect picture. The control device may use this information for activating an action plan, for example, alert an operator and/or stop the assembly line or any other suitable action plan that can be used to rectify the detected defect.

It should be noted that the pattern 8 that is to be identified can be a part of a larger pattern, for example a smaller part of one or both seams; or may be the entire pattern over a selected area of the first web. The entire pattern may thus be one of or both the seams over a selected area in the machine direction.

The control device 18 is advantageously arranged to calculate the lateral position of the pattern 8 in the first web 6 when the pattern 8 has been detected. For example, the lateral position can be calculated from information extracted from the first picture. As mentioned before, the first picture is converted into an electrical first signal and this can be done by, for example, breaking down the picture into a number of discrete elements that are investigated. Here "investigated" means that the control device converts the discrete element into electrical signals that represent the discrete element. The control device 18 also chooses an order in which the discrete elements are investigated. The described investigation is commonly referred to as scanning, but other methods for investigating the picture can be used. The first picture is then investigated in the same manner and is compared to the stored id-signals. When the control device 18 has detected the existence of the pattern the position of the pattern can be calculated by comparing the position of the detected pattern 8 in the picture.

The control device 18 uses the information regarding the lateral position of the pattern to calculate the first centre line and to control the position of the first 6 and/or second web 7 so that the first centre line is brought into alignment with the second centre line 10.

The control device 18 may advantageously comprise a logic unit that performs various mathematical tasks that are used for pattern detection purposes and control purposes according to an algorithm. The logic unit may, for example, be arranged to keep track of the lateral position of the pattern, i.e. one of or both the seams. If the lateral position of the pattern 8 suddenly alters above a selected threshold, the logic unit may be arranged to ignore the information as being a faulty detection of the pattern and may be arranged to either investigate the first picture again or investigate the next picture.

In one embodiment of the invention, the assembly line 1 comprises a second camera (not shown) that can be arranged to take second pictures of the second web. The assembly line 1 then comprises a second transformer for transforming the second pictures into a second signal. The control device 18 is arranged to use the second signal for determining the position of the second centre line 10 in the second web and the control device 18 is arranged to use the second signal for controlling a second guidance device that controls the lateral position of the second web so that the first centre line 9 becomes aligned with the second centre line 10 during assembly of the first web 6 to the second web 7.

In another embodiment of the invention, the assembly line 1 comprises a third camera (29; FIGS. 2 and 3) that can be arranged to take third pictures of a third web 27. The assembly line 1 then comprises a third transformer for transforming the third pictures into a third signal. The control device 18 is arranged to use the third signal for determining the position of a third centre line (not shown) in the third web 27 and the control device 18 is arranged to use the third signal for controlling a third guidance device 28 that controls the lateral position of the third web 27 so that the first centre line becomes aligned with the second centre line and the third centre line during assembly of the first web to the second web.

In FIG. 1 the first web 6 is a continuous topsheet and the second web in the form of discrete absorbent bodies and the third web a continuous backsheet. Advantageously, the conveyer belt 11 is fixed in its position and comprises a reference line 20 known to the control device 18. The positioning of the second 7 and third web 27 onto the conveyer belt 11 is made to this reference line 20 by use of the second 21 and third guidance devices respectively. The first web 6 is then positioned onto the absorbent bodies 3 so that the first centre line is aligned with the second centre line 10. Hence, the first centre line becomes aligned with the reference line.

It should be noted that the control device 18 may control the first web 6 only and that one or several further control devices may be comprised in the assembly line 1 for controlling the second web 7 and/or the third web 27. The further control device(s) may thus operate independently from the control device 18 controlling the first web and may operate independently of each other when a reference line is used. The control devices may also be arranged for intercommunication for control of the assembly line.

The first camera 22 described in connection to FIG. 1 periodically takes pictures of the first web with a sampling frequency that is dependent on the feeding speed of the first web and the processing speed of the control device 18. The faster the feeding speed the higher the frequency. However, the first camera 22 may take pictures continuously, i.e. may film the first web with an open shutter and the control device may then draw sample pictures from the film or may calculate continuously should the processor in the first transformer and in the control device be arranged to handle such continuous processes. Here "open shutter" refers to the use of a camera comprising mechanical parts, but when using digital cameras or another technique the shutter is replaced by a different device that allows for light to enter a recording medium, for example a chemical film or a digital or magnetic recording device. The second and/or the third camera(s) may be arranged in the same manner as the first camera.

FIG. 1 shows that the first camera 22 takes a first picture of a first area of the first web before the assembly point 13. As been explained before the assembly point is the area in which the first web is attached to the second web. In FIG. 1 the projection path of the first camera 22 is marked with broken lines in order to facilitate the description of the invention. In the first area is shown that the first centre line 9 is not aligned with the second centre line 10. The difference is marked with $\Delta d$ and is a measure $c2-c1$ of how much the first web 6 or the second web 7 has to be moved in order for the first centre line 9 to become aligned with the second centre line 10. Here "c1" refers to the first centre line 9 and "c2" to the second centre line 10. The control device calculates $\Delta d$ from information in the first picture and information regarding the position of the second centre line. The control device 18 uses the information to control the first guidance device 17 that is arranged to alter the path of the first web in the cross-machine direction with a distance corresponding to $\Delta d$.

In FIG. 1 is shown that after the assembly point 13 the first centre line 9 is aligned with the second centre line 10. FIG. 1 also shows a first centre line 9' potentially misaligned with the second centre line 10 and a corresponding misalignment distance $\Delta d'$ that would have been the consequence if the lateral position of the first web had not been shifted before the assembly point.

FIG. 2 schematically shows a side view of the assembly line 1 according to FIG. 1. FIG. 2 shows that the assembly point 13 comprises a bonding device 14 in the form of a set of rollers. The rollers presses together selected portions of the first and the second web. The selected portions are then bonded together by use of any suitable means known in the art. The rollers may for example comprise means for ultrasonic bonding and/or mechanical bonding and/or heat bonding. However, the rollers may be replaced by any other suitable device for bonding together the first and the second web when the first web is moving, for example, an ultrasonic welding device or mechanical bonding device or a welding device. The welding device can be a laser device or another type of heating device.

The rollers may be used as a separating device for separating the first web into pieces. The rollers may comprise cutting edges formed in a selected pattern that cuts the first web during rotation of the rollers. Each piece is preferably in a shape that corresponds to the shape of the absorbent body or in any other selected form. In FIG. 2 the separating device 15 is a unit separate from the bonding device 14. The separating device 15 may be positioned in connection to the bonding device 14 or after the bonding device 14. The separating device 15 may be a cutting device or a shearing device or any other device suitable for separating the laminate of webs when the webs are moving. Here the "laminate" may comprise the first web 6 and/or the second web 7 and/or the third web 27. In FIG. 2 the separating device 15 performs a linear movement for cutting, but the separating device may comprise two opposing rollers comprising cutting or shearing edges (see FIG. 3) that rotates with the layered first 6, second 7 and third webs 27 in the machine direction and cuts the layered web upon rotation.

The assembly line 1 may comprise a bonding device 14 that bonds the third web to the first web in a peripheral seam around the absorbent body so that the absorbent body 3 is enclosed within a closed volume defined by the topsheet, i.e. the first web, and the backsheet, i.e. the third web. The first web 6 then does not have to be attached to the absorbent body 3, but the absorbent body 3 may be kept in place by the closed volume being small enough to hinder any movement of the absorbent body 3. The assembly line 1 may also comprise a separating device 15 arranged to cut the laminate of webs 6, 7, 27 so that the absorbent article may be formed accordingly. Hence, in case the second web 7 is a continuous web the cutting device is also arranged to cut the second web accordingly.

The assembly line may comprise a third camera 29 for controlling the third centre line of the third web 27. The third camera 29 together with a control device may be used in the same manner as been described above with reference to the first camera 22 and the second camera.

FIG. 3 schematically shows an embodiment of the invention where the absorbent article comprises only a backsheet 5 and an absorbent topsheet 4. The first web 6 then is a combination of a topsheet and absorbent body and the second web is the backsheet, or vice versa. The assembly line in FIG. 3 is identical to the assembly line in FIGS. 1 and 2 with regard to the inventive process of alignment. The difference is that in FIG. 3 there is only the first web 6 and the second web 7 and the separating device 15 comprises two opposing rollers 30, each with a cutting edge 31. As mentioned in connection to FIGS. 1 and 2, the separating device 15 is not restricted to rollers 30 but may be a shearing device or any other suitable separating device.

FIGS. 4-9 schematically show a flow chart of a process according to the invention.

Figure 4:
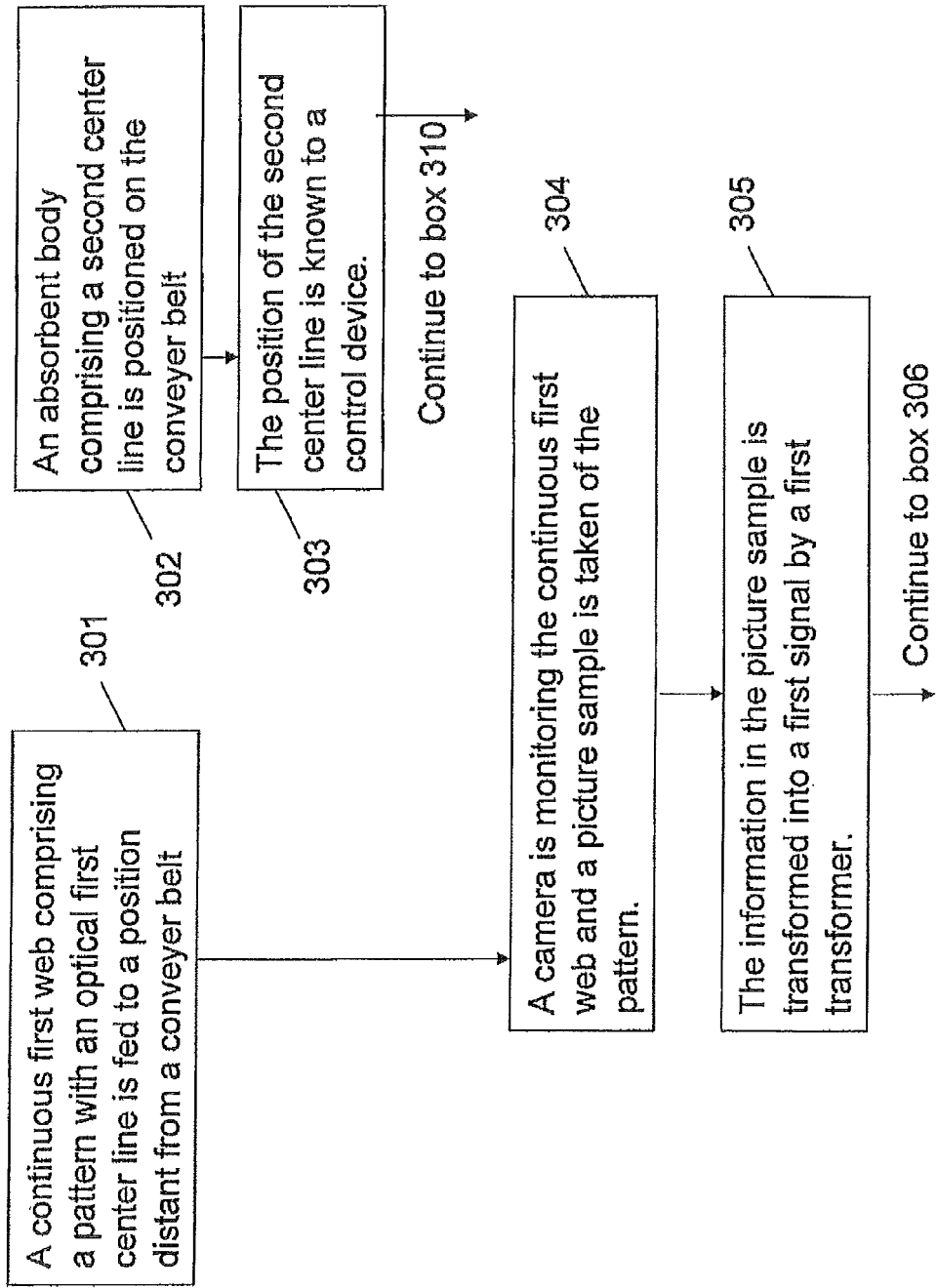
Figure 5:
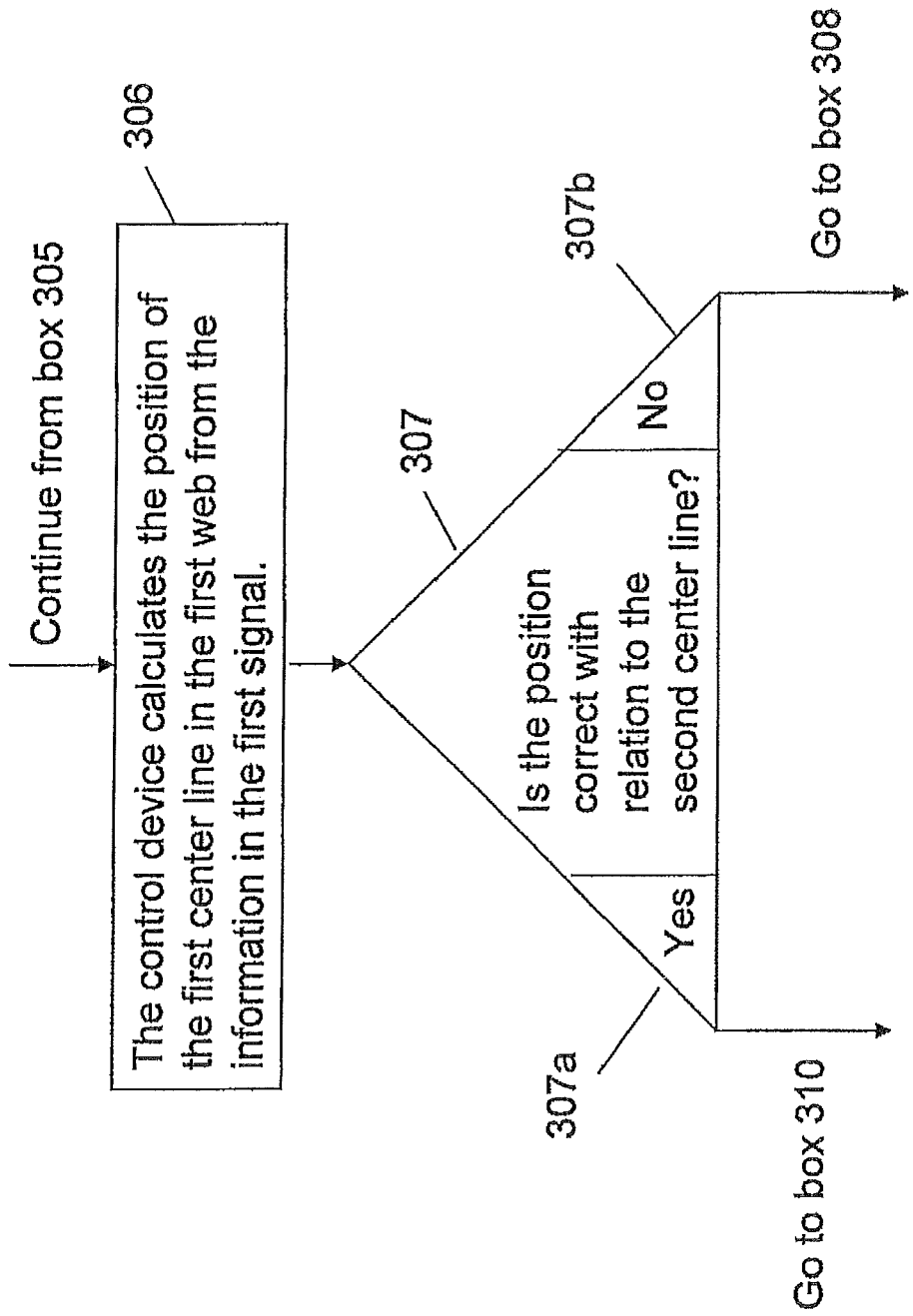

FIG. 4 shows Box 301-305.

Box 301:

A continuous first web comprising a pattern with an optical first centre line is fed to a position distant from a conveyer belt. The first web is fed to the position by a first transport system according to FIGS. 1-3. It should be noted the conveyer belt can be replaced by any other suitable means for transporting the second web allowing the first web to be placed onto the second web. Go to Box 304

Box 302

A discontinuous second web in the form of a number of absorbent bodies is fed to the conveyer belt by a second transport system according to FIGS. 1-3. Each absorbent body comprises a second centre line and is positioned on the conveyer belt at a predetermined positioned. Go to BOx 303.

Box 303

By positioning the second web at a predetermined position the position of the second centre line becomes known to a control device. The predetermined positioned may comprise a reference line that is to be aligned with the second centre line. The reference line may then be known to the control unit so that the position of the aligned second centre line becomes known. In another embodiment, the second centre line may be known to the control device by an adaptive detector means that detects the lateral position of the second centre line relative the conveyer belt. The detector means may be a camera as explained in Box 304. Go to Box 310.

Box 304

A camera is monitoring the continuous first web and a picture sample is taken of the pattern. The picture is taken when the first web is positioned at a distance from the second web, i.e. before the first web is brought into contact with the second web. Hence, the camera is positioned before the marriage point, i.e. before the first web is brought into contact with the second web. Advantageously, the second camera is positioned closed to a first guidance device arranged to control the lateral position of the first web. Go to Box 305.

Box 305

The information in the picture sample is transformed into a first signal by a first transformer. Go to box 306

Figure 6:
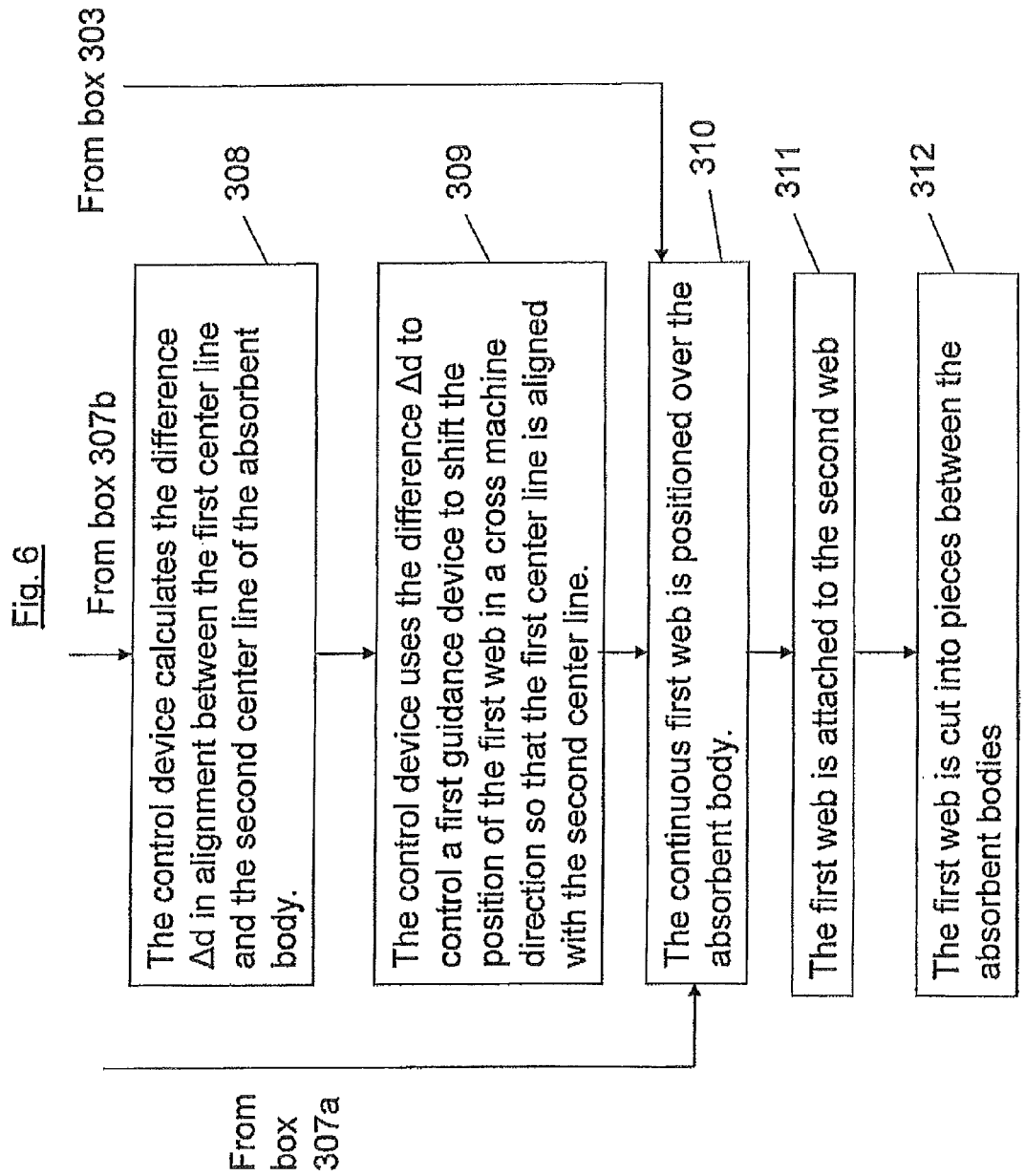

FIG. 6 shows Box 306-307.

Box 306

The control device calculates the position of the first centre line in the first web from the information in the first signal. The control device may use any of the techniques described in connection to FIGS. 1-3. Go to Box 307.

Box 307

After having decided on the position of the first centre line in the first web, the control device evaluates if the position of the first centre line is correct with relation to the second centre line. The second centre line is known to the control device.

Box 307a

If the answer to the question in Box 307 is yes, then go to Box 310 If the answer is yes the control device does not have to change the position of the first centre line in relation to the second centre line since they are already aligned.

Box 307b

If the answer to the question in Box 307 is no, go to Box 308. If the answer is no the control device has to change the position of the first centre line in relation to the second centre line so that they become aligned.

FIG. 6 shows Box 308-312:

Box 308

From Box 307b

The control device calculates the difference Δd in alignment between the first centre line and the second centre line of the absorbent body.

Box 309

The control device uses the information regarding the difference Δd in Box 307b to control the first guidance device to shift the position of the first web in a cross-machine direction so that the first centre line becomes aligned with the second centre line.

Box 310

From Box 303 or Box 307a

Box 310

The continuous first web is positioned over the absorbent body. The first web is thus positioned at a distance above the second web before the second web is brought into contact with the second web.

Box 311

The first web is attached to the second web. This can be done any known means, for example, welding, gluing, etc, which has been explained above. If a third web is comprised in the assembly on the opposite side of the absorbent article with relation to the first web, the attachment may be done indirectly by attaching the first web to the third web along the periphery of the absorbent body. However, the absorbent body may also be a part of the joint, i.e. the first web, the second web and the third web may be attached to each other.

Box 312

The first web is cut into pieces between the absorbent bodies. Hence, this operation separates the laminated web into absorbent articles. The cutting may be done by any known means and the laminated web may be cut along a selected profile so that the absorbent article is given a desired shape.

Figure 7:
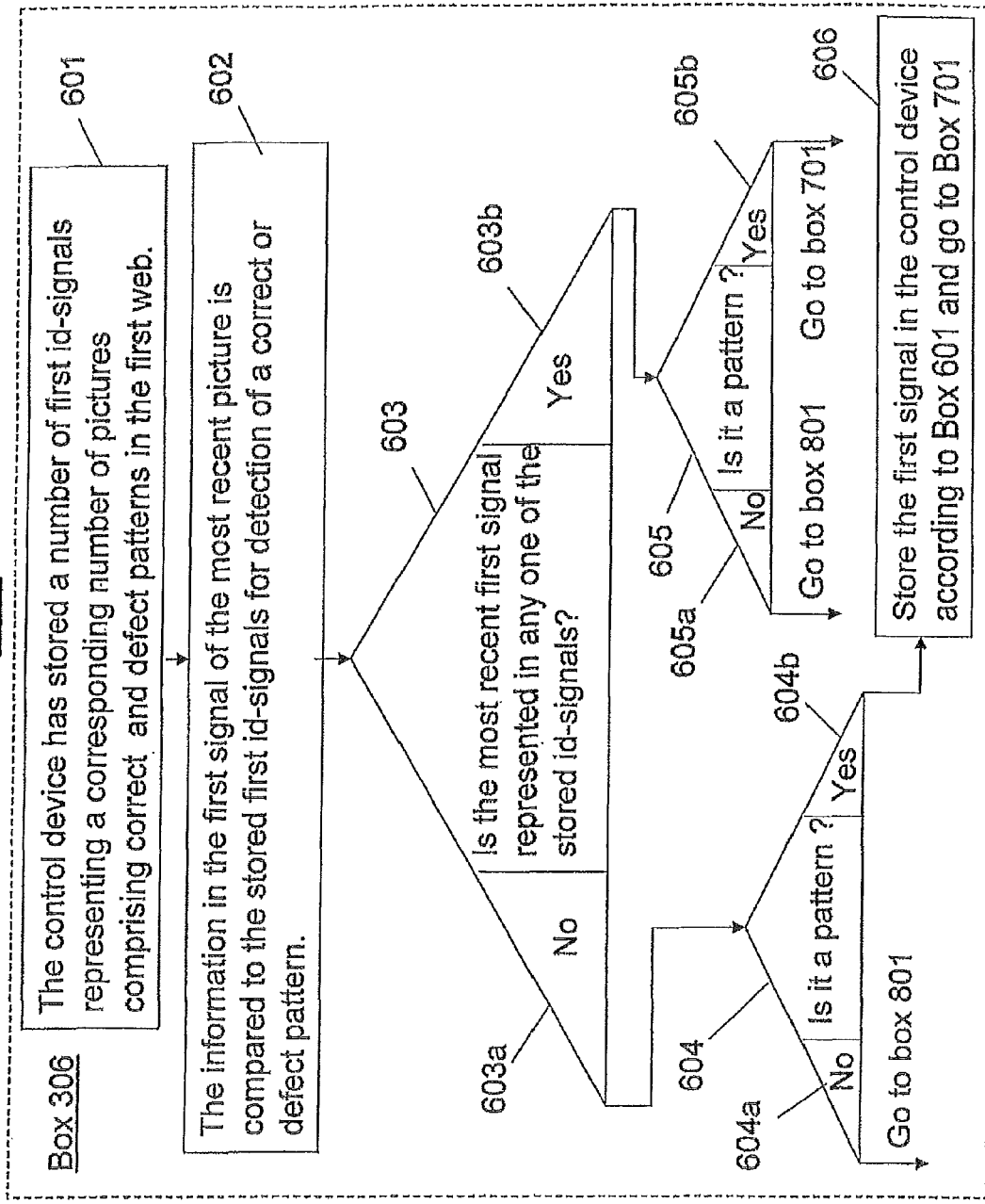
Figure 8:
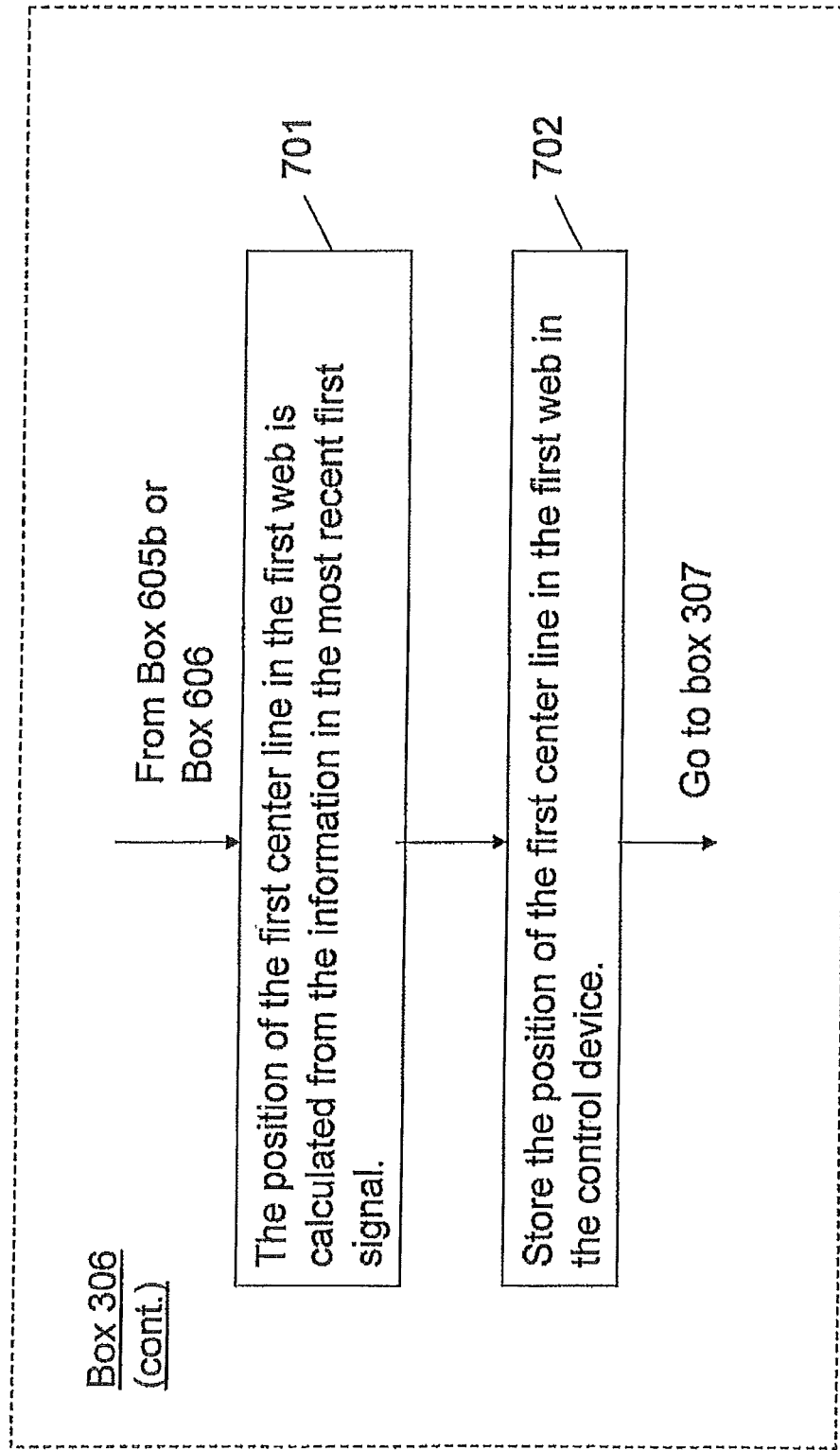

FIGS. 7-9 show a flow chart of events taking place in Box 306 when deciding on if the first centre line is aligned with the second centre line.

Box 306:

FIG. 7:

Box 601

The control device has stored and is able to store a number of first id-signals representing a corresponding number of first pictures comprising correct and/or defect patterns in the first web. The wording "correct" and "defect" has been explained in connection to FIGS. 1-3.

Box 602

The control device compares information in the first signal of the most recent picture to the stored first id-signals for detection of a correct or defect pattern in the first web.

Box 603

The control device checks if the most recent first signal is represented in anyone of the stored id-signals.

Box 603a

If the answer to the question in Box 603 is no then go to Box 604. Here, the most recent first signal is neither identified as a correct pattern nor identified as a defect pattern.

Box 603b

If the answer to the question in Box 603 is yes then go to Box 605.

Box 604

Is it a pattern? If the control device finds that the most recent first signal is not represented in anyone of the stored id-signals the control device checks if the most recent first signal is a pattern. As been mentioned above in connection to Box 601, the control device may alternatively or also comprise stored id-signals representing non-patterns, i.e. faulty patterns or patterns that for any reason has been chosen to be faulty. The control device can then use both faulty patterns and patterns for controlling the position of the first web.

Box 604a

If the answer to the question in Box 604 is no go to Box 801. As mentioned above in connection to Box 604, the pattern may be stored in the control device even though it is not the desired pattern or if it is a faulty pattern. Here, an machine operator may decide that the picture, i.e. the most recent signal, is not a pattern but that it should be stored in the control device according to Box 601 and then go to Box 801.

There may also be other alternatives than to use a person to find out whether the most recent signal should be recognized as a faulty pattern, for example an automatic detection system.

Box 604*b*

If the answer to the question in Box 604 is yes go to Box 606. Here, an machine operator may decide that the picture, i.e. the most recent signal, is a pattern. There may also be other alternatives than to use a person to find out whether the most recent signal should be recognized as a pattern, for example an automatic detection system.

Box 605

Is it a pattern? If the control device finds that the most recent first signal is represented in anyone of the stored id-signals the control device checks if the most recent first signal is a pattern or not.

Box 605*a*

If the answer to the question in Box 605 is no go to Box 801.

Box 605*b*

If the answer to the question in Box 604 is yes go to Box 701

Box 606

Store the most recent first signal in the control device according to Box 601 and go to Box 701

FIG. 8:

From Box 605*b* or Box 606

Box 701

The position of the first centre line in the first web is calculated from the information in the most recent first signal. Go to Box 702. Here, the control device can compare the new position with the former position of the first centre line, i.e. the previously calculated position, and can then evaluate if it is physically possible for the first centre line to have moved the calculated distance in the lateral direction. If this is not possible, the control device should disregard from the result and skip to the next picture, i.e. go to Box 304 for evaluation of a new picture; and if it is possible continue to Box 702.

Box 702

Store the position of the first centre line in the first web in the control device together with the corresponding first signal. Go to Box 307

FIG. 9:

From Box 604*a* or Box 605*a*

Box 801

Check new picture? If the control device finds that the most recent first signal is not represented in anyone of the stored id-signals and that it is not a pattern according to box 604*a* an action plan is required. If the control device finds that the most recent first signal is represented in anyone of the stored id-signals and that it is not a pattern there still exists a need for an action plan. The action plan I here to decide whether to continue with the production or not. The basic question to investigate is thus whether if the most recent picture should be disregarded and a new picture should be examined?

Box 801*a*

If the answer to the question in Box 801 is no go to Box 802. Hence, if the result from the investigation of the most recent first picture is valid and a new picture shall not be examined instead, an action plan is needed in order to decide whether to stop the assembly line or not.

Box 801*b*

If the answer to the question in Box 801 is yes go to Box 304. Hence if the result from the investigation of the most recent first picture is regarded as faulty a new picture shall be examined instead, an action plan is need in order to decide whether to stop the assembly line or not. If the response time for the control device is quick with relation to the speed of the assembly line, a new picture or a number of new pictures may be examined according to Box 304 in order to find out if the last one was faulty before deciding to stop the assembly line.

The invention claimed is:

1. An adaptive assembly line for assembly of a continuous first web to a continuous or discontinuous second web, the assembly line being arranged to feed the first web and the second web in a machine direction, the assembly line comprising a control device comprising a first camera arranged to take a first picture of the first web, the control device comprising a first transformer for transforming the first picture into a first signal, the control device being arranged to control the position of the first web with relation to the second web, wherein the first camera is arranged to take the first picture before assembly of the first web to the second web and the control device is arranged to use the first signal for determining the position of a first center line in the first web by detecting a pattern in the first web, the control device is arranged to calculate the position of the first center line in the first web with regard to the pattern comprised in the first web, the control device is arranged to use the first signal for controlling the position of the first web or the second web so that the first center line becomes aligned with a second center line comprised in the second web during assembly of the first web to the second web.

2. The adaptive assembly line according to claim 1, wherein the first web comprises, in a cross-machine direction, two side portions and a center portion bonded together by two seams in the machine direction, wherein the pattern comprises one of or both the two seams.

3. The adaptive assembly line according to claim 1, wherein the first center line is an optical center line.

4. The adaptive assembly line according to claim 1, wherein the control device is arranged to store signatures of the pattern in the first web for detection of the pattern in the first picture or defect signatures of the pattern for detection of a faulty pattern in the first web.

5. The adaptive assembly line according to claim 1, wherein the second center line is known to the control device before assembly.

6. The adaptive assembly line according to claim 1, wherein the first camera is arranged to take pictures continuously or periodically.

7. The adaptive assembly line according to claim 1, wherein the first and second center lines extend in the machine direction.

8. The adaptive assembly line according to claim 1, wherein assembly line comprises a conveyor belt and that the second web is positioned on the conveyor belt.

9. The adaptive assembly line according to claim 1, wherein the control device is arranged to control the first web in a cross-machine direction being essentially perpendicular to the machine direction.

10. The adaptive assembly line according to claim 1, wherein a second camera is arranged to take second pictures of the second web, the assembly line comprising a second transformer for transforming the second pictures into a second signal, the control device being arranged to use the second signal for determining the position of the second center line in the second web and that the control device is arranged to use the second signal for controlling the position of the first web and/or the second web so that the first center line becomes aligned with the second center line during assembly of the first web to the second web.

11. A method for assembly of a continuous first web to a continuous or discontinuous second web, comprising:
- feeding to an assembly line the first web and the second web in a machine direction, the assembly line comprising a control device,
- taking a first picture of the first web with a first camera,
- transforming the first picture into a first signal with a first transformer,
- controlling the position of the first web with relation to the second web with the control device,
- wherein the first camera takes the first picture before assembly of the first web to the second web and the control device uses the first signal for determining the position of a first center line in the first web by detecting a pattern in the first web, the control device calculates the position of the first center line in the first web with regard to the pattern comprised in the first web and the control device uses the first signal for controlling the position of the first web or the second web so that the first center line becomes aligned with a second center line comprised in the second web during assembly of the first web to the second web.

12. The method according to claim 11, wherein the first web comprises, in a cross-machine direction, two side portions and a center portion bonded together by two seams in the machine direction, wherein the pattern comprises one of or both the two seams.

13. The method according to claim 11, wherein the first center line is an optical center line.

14. The method according to claim 11, wherein the control device stores signatures of the pattern in the first web for detection of the pattern in the first picture or defect signatures of the pattern for detection of a faulty pattern in the first web.

15. The method according to claim 11, wherein the second center line is known to the control device before assembly.

16. The method according to claim 11, wherein the first camera takes pictures continuously or periodically.

17. The method according to claim 11, wherein the first and second center lines extend in the machine direction.

18. The method according to claim 11, wherein the assembly line comprises a conveyor belt and the second web is positioned on the conveyor belt.

19. The method according to claim 11, wherein the control device controls the first web in a cross-machine direction being essentially perpendicular to the machine direction.

20. The method according to, claim 11, wherein the assembly line further comprises a second camera that takes second pictures of the second web, the assembly line comprising a second transformer for transforming the second pictures into a second signal, the control device using the second signal for determining the position of the second center line in the second web, and the control device using the second signal for controlling the position of the first web or the second web so that the first center line becomes aligned with the second center line during assembly of the first web to the second web.

* * * * *